(12) United States Patent
Hurley et al.

(10) Patent No.: US 12,715,281 B2
(45) Date of Patent: Aug. 25, 2026

(54) RECIRCULATION CHECK VALVE

(71) Applicant: FCA US LLC, Auburn Hills, MI (US)

(72) Inventors: Darrin W. Hurley, Flat Rock, MI (US); Jeffrey A. Johnson, Clawson, MI (US); Michael T. Marcon, Lake Orion, MI (US); Samuel Marinho de Oliveira Gonçalves, Pará de Minas (BR)

(73) Assignee: FCA US LLC, Auburn Hills, MI (US)

( * ) Notice: Subject to any disclaimer, the term of this patent is extended or adjusted under 35 U.S.C. 154(b) by 237 days.

(21) Appl. No.: 18/633,868

(22) Filed: Apr. 12, 2024

(65) Prior Publication Data

US 2025/0319764 A1 Oct. 16, 2025

(51) Int. Cl.
*B60K 15/035* (2006.01)
*B60K 15/03* (2006.01)

(52) U.S. Cl.
CPC .................. *B60K 15/03519* (2013.01); *B60K 2015/03263* (2013.01); *B60K 2015/03289* (2013.01); *B60K 2015/03576* (2013.01)

(58) Field of Classification Search
CPC .............. B60K 15/03519; B60K 15/04; B60K 2015/03263; B60K 2015/03289; B60K 2015/03576; B60K 2015/03256
See application file for complete search history.

(56) References Cited

U.S. PATENT DOCUMENTS 4,714,172 A * 12/1987 Morris .................. B65D 90/32 96/108
4,798,306 A * 1/1989 Giacomazzi ....... F02M 25/0872 141/286
4,809,863 A * 3/1989 Woodcock ............ B60K 15/04 220/746
5,014,742 A * 5/1991 Covert .................... F16K 24/04 141/46
5,027,868 A * 7/1991 Morris ............ B60K 15/03519 96/163
5,054,520 A * 10/1991 Sherwood ........ B60K 15/03519 141/59
5,131,439 A * 7/1992 Bucci ..................... B60K 15/04 141/285
9,592,730 B2 3/2017 Revink et al.
2005/0155670 A1* 7/2005 Aschoff ........... B60K 15/03519 141/301

* cited by examiner

*Primary Examiner* — Patrick C Williams
(74) *Attorney, Agent, or Firm* — Jeremy J. Klobucar

(57) ABSTRACT

A recirculation check valve positioned between a fuel system filler tube and a fuel system recirculation line. The check valve includes a hollow cylindrical insert having a plurality of radially inwardly extending projections provided around an inner circumference of the hollow cylindrical insert that are separated by a plurality of gaps therebetween. A valve member provided between the hollow cylindrical insert and an outlet of a housing of the check valve that is configured to move between an open position where the valve member is seated against the plurality of radially inwardly extending projections and a closed position where the valve member is seated against a valve seat formed in a channel of the housing.

16 Claims, 4 Drawing Sheets

RECIRCULATION CHECK VALVE

FIELD

The present disclosure relates to a recirculation check valve for a vehicle evaporative emission system.

BACKGROUND

This section provides background information related to the present disclosure which is not necessarily prior art.

Evaporative emission systems are an important feature in modern vehicles which serve to reduce fuel vapor emissions by capturing and recycling vapor that would otherwise escape into the atmosphere. This is especially important during the process of refueling, which produces an abundance of free fuel vapor. In a typical vehicle fuel system, fuel vapors are displaced out of the fuel tank and up the filler tube by the introduction of liquid fuel to the tank during refueling. Conventionally, a fuel connector is situated between a branch or extension of the filler tube and the vehicle's recirculation line, sealingly connecting the two in order to facilitate passage of the displaced vapors without leakage. Generally, the displaced vapors travel down the recirculation line and into a vapor cannister, where they are ultimately purged into the engine during normal combustion.

However, liquid fuel backflow into the recirculation line remains a persistent problem despite existing preventative measures. This is especially true in instances of overfilling the vehicle gas tank during refueling. The introduction of liquid fuel into the recirculation line can create a number of vehicular problems, which can generate costly repairs for the operator. Accordingly, it is desirable to create a solution that would prevent fuel backflow into the recirculation line, thereby avoiding expenditures and repairs to the operator.

SUMMARY

This section provides a general summary of the disclosure, and is not a comprehensive disclosure of its full scope or all of its features.

According to a first aspect of the present disclosure, there is provided a fuel system for a vehicle that may include a fuel tank configured to carry a liquid fuel; a filler tube in communication with the fuel tank, the filler tube having an inlet configured for receipt of a fuel nozzle and an outlet downstream from the inlet and upstream from the fuel tank; a recirculation check valve attached to the outlet; and a recirculation line that is connected to the recirculation check valve. The recirculation check valve may include a housing have an inlet end attached to the outlet and an outlet end attached to the recirculation line, and a channel extending between the inlet end and the outlet end that fluidly connects the outlet of the filler tube to the recirculation line; a hollow cylindrical insert is provided in the channel between the inlet end and the outlet end, the hollow cylindrical insert having a plurality of radially inwardly extending projections provided around an inner circumference of the hollow cylindrical insert that are separated by a plurality of gaps therebetween; and a valve member provided in the channel between the hollow cylindrical insert and the outlet end of the housing, and configured to move between an open position where the valve member is seated against the plurality of radially inwardly extending projections and a closed position where the valve member is seated against a valve seat formed in the channel; wherein in the open position, fumes of the liquid fuel are permitted to travel from the fuel tank through the filler tube and the channel of the recirculation check valve by passing through the plurality of gaps past the valve member to the recirculation line, and fumes of the liquid fuel in the recirculation line are permitted to enter the outlet end of the housing and flow through the channel of the recirculation check valve by passing past the valve member and through plurality of gaps to the filler tube; and wherein when liquid fuel enters the inlet end of the recirculation check valve and reaches the valve member, the valve member is configured to move away from being seated against the plurality of protrusions in a direction toward the valve seat to close the recirculation check valve and prevent the liquid fuel from exiting the outlet end of the housing and entering the recirculation line.

According to the first aspect, the valve member is a ball valve formed of a material having a density less than that of the liquid fuel.

According to the first aspect, the channel includes a first section having a first diameter, a second section having a second diameter that is less than the first diameter, a third section having a third diameter that is less than the second diameter, and a fourth section having a fourth diameter that is less than the third diameter.

According to the first aspect, the first section is separated from the second section by a radially inwardly extending shoulder.

According to the first aspect, the hollow cylindrical insert includes a first end that includes a radially outwardly extending lip, a second end that includes the plurality of radially inward extending projections, and a cylindrical section that extends between the first end and the second end, and the radially outwardly extending lip being configured to abut against the radially inwardly extending shoulder, and the radially inwardly extending projections and cylindrical section being provided in the second section of the channel.

According to the first aspect, the third section is separated from the fourth section by the valve seat.

According to the first aspect, the valve member has a diameter that is less than a diameter of the third section.

According to the first aspect, at least one annular seal may be provided in the first section between the inlet end and the hollow cylindrical insert.

According to the first aspect, a pair of the annular seals may be provided in the first section that are separated by an annular spacer.

According to the first aspect, a retainer insert may be provided between the inlet end of the housing and the pair of annular seals that are separated by the annular spacer.

According to a second aspect of the preset disclosure, there is provided a recirculation check valve configured for use in a fuel system for a vehicle that includes a fuel tank configured to carry a liquid fuel; a filler tube in communication with the fuel tank and having an inlet configured for receipt of a fuel nozzle and an outlet downstream from the inlet and upstream from the fuel tank; and a recirculation line that is connected to the recirculation check valve. The recirculation check valve may include a housing have an inlet end configured to be attached to the outlet and an outlet end configured to be attached to the recirculation line, and a channel extending between the inlet end and the outlet end that is configured to fluidly connect the outlet of the filler tube to the recirculation line; a hollow cylindrical insert provided in the channel between the inlet end and the outlet end, the hollow cylindrical insert having a plurality of radially inwardly extending projections provided around an inner circumference of the hollow cylindrical insert that are separated by a plurality of gaps therebetween; and a valve member provided in the channel between the hollow cylindrical insert and the outlet end of the housing, and configured to move between an open position where the valve member is seated against the plurality of radially inwardly extending projections and a closed position where the valve member is seated against a valve seat formed in the channel; wherein in the open position, the recirculation check valve is configured such that fumes of the liquid fuel are permitted to travel from the fuel tank through the filler tube and the channel of the recirculation check valve by passing through the plurality of gaps past the valve member to the recirculation line, and fumes of the liquid fuel in the recirculation line are permitted to enter the outlet end of the housing and flow through the channel of the recirculation check valve by passing past the valve member and through plurality of gaps to the filler tube; and wherein the recirculation check valve is configured such that when liquid fuel enters the inlet end of the recirculation check valve and reaches the valve member, the valve member is configured to move away from being seated against the plurality of protrusions in a direction toward the valve seat to close the recirculation check valve and prevent the liquid fuel from exiting the outlet end of the housing and entering the recirculation line.

According to the second aspect, the valve member is a ball valve formed of a material having a density less than that of the liquid fuel.

According to the second aspect, the channel includes a first section having a first diameter, a second section having a second diameter that is less than the first diameter, a third section having a third diameter that is less than the second diameter, and a fourth section having a fourth diameter that is less than the third diameter.

According to the second aspect, the first section is separated from the second section by a radially inwardly extending shoulder.

According to the second aspect, the hollow cylindrical insert includes first end that includes a radially outwardly extending lip, a second end that includes the plurality of radially inward extending projections, and a cylindrical section that extends between the first end and the second end, and the radially outwardly extending lip being configured to abut against the radially inwardly extending shoulder, and the radially inwardly extending projections and cylindrical section being provided in the second section of the channel.

According to the second aspect, the third section is separated from the fourth section by the valve seat.

According to the second aspect, the valve member has a diameter that is less than a diameter of the third section.

According to the second aspect, at least one annular seal may be provided in the first section between the inlet end and the hollow cylindrical insert.

According to the second aspect, a pair of the annular seals are provided in the first section that are separated by an annular spacer.

According to the second aspect, a retainer insert between the inlet end of the housing and the pair of annular seals that are separated by the annular spacer.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. The example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
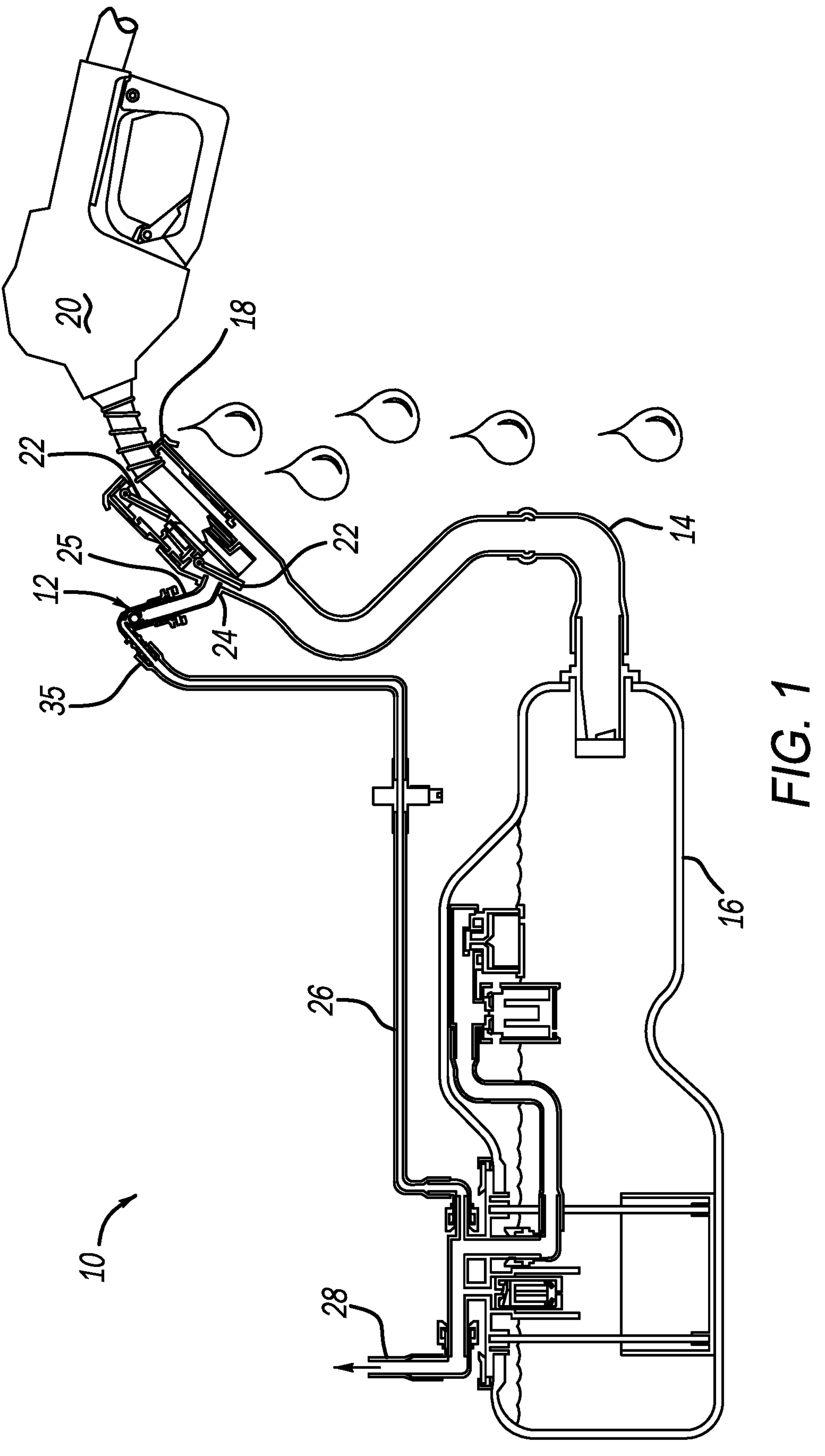
FIG. 1 is a schematic illustration of a vehicle fuel system incorporating a recirculation check valve according to a principle of the present disclosure.

FIG. 1 illustrates a vehicle fuel system 10 that includes a recirculation check valve 12 according to a principle of the present disclosure. Vehicle fuel system 10 may be incorporated into vehicles (not shown) that are powered by an internal combustion engine, or are powered by each of an internal combustion engine and a battery pack (e.g., hybrid vehicle).

The vehicle fuel system 10 generally includes a filler tube 14 that is in fluid communication with and directs liquid fuel to a fuel tank 16. In this regard, filler tube 14 has an inlet 18 which is configured for receipt of a fuel nozzle 20. To prevent fuel and vapors from escaping out of inlet 18 when inlet 18 is not in use, a pair of flapper valves 22 may be located at inlet 18 that close inlet 18 when no nozzle 20 is present to seal inlet 18, and open inlet 18 (i.e., pivots away from inlet 18 into filler tube 14) when contacted by nozzle 20 during refueling.

Filler tube 14 also includes an outlet port 24 downstream from inlet 18 and upstream from fuel tank 16 that is configured to receive vapors that travel from fuel tank 16 back through filler tube 14 before the vapors reach inlet 18, and direct the vapors through an outlet line 25 attached to outlet port 24 and recirculation check valve 12, which are connected a fuel vapor recirculation line 26. Recirculation line 26 extends between recirculation check valve 12 and a fuel line 28 that directs liquid fuel from tank 16 to an engine (not shown) of the vehicle, as will be described in more detail later.

Figure 2:
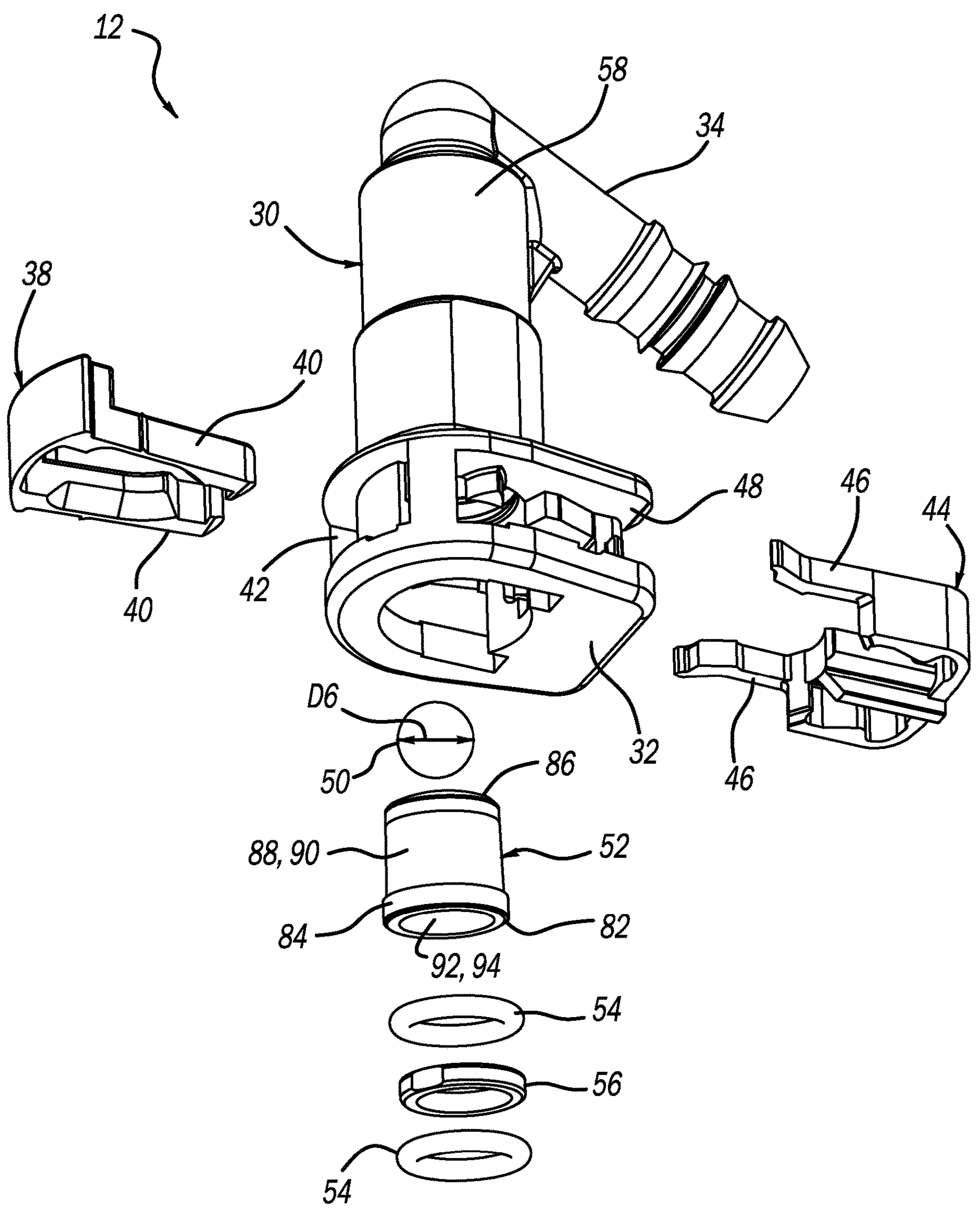
FIG. 2 is an exploded view of the recirculation check valve according to a principle of the present disclosure.
Figure 3:
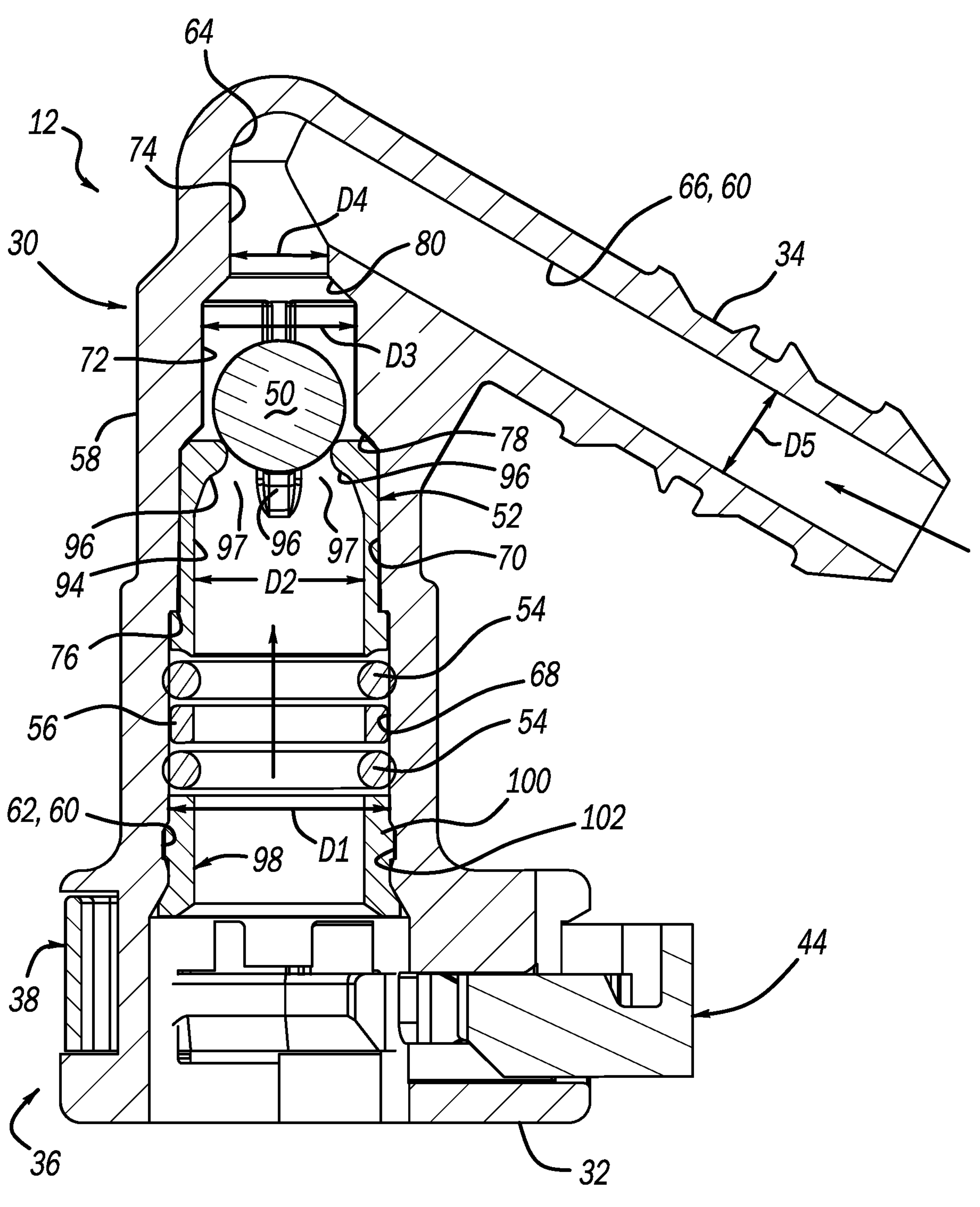
FIG. 3 is a cross-sectional view of the recirculation check valve according to a principle of the present disclosure in an open position, but in a condition where no liquid fuel is present therein.
Figure 4:
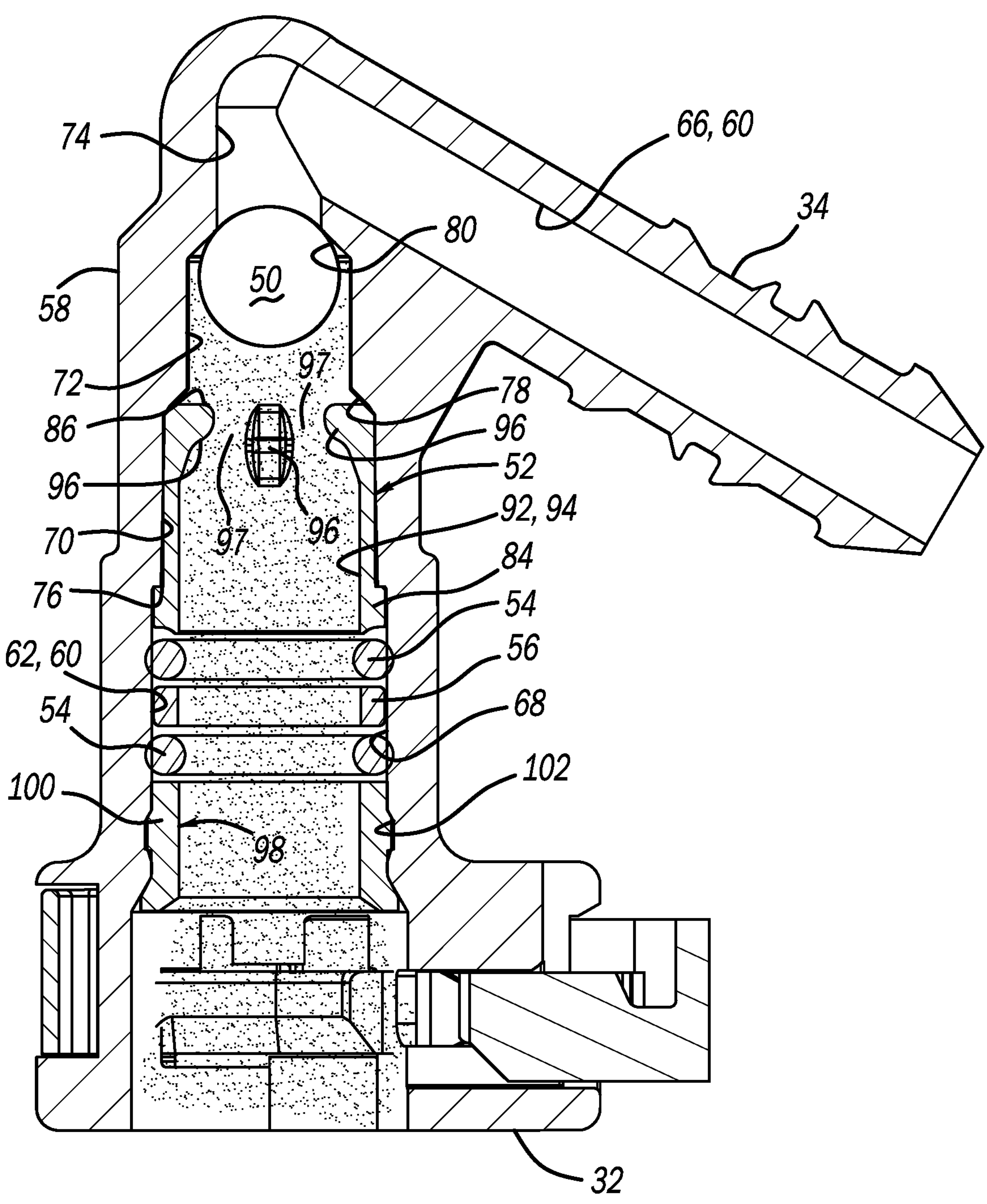
FIG. 4 is a cross-sectional view of recirculation check valve in a closed position due to the presence of liquid fuel therein.

Turning now to FIGS. 2-4, recirculation check valve 12 is illustrated. Recirculation check valve 12 may include a housing 30 having an inlet end 32 configured for receipt of a portion of outlet line 25 and an outlet end 34 that is configured to be attached to an end of recirculation line 26. Inlet end 32 may include a retainer or clamp assembly 36 that can be actuated to quickly connect and disconnect recirculation check valve 12 from outlet line 25. In this regard, clamp assembly 36 includes a first clamp 38 having a first pair of resilient arms 40 that are configured to pass through an aperture 42 formed in inlet end 32 and clamp an end of outlet line 25 when outlet line 25 is mated with inlet end 32 of recirculation check valve 12. Clamp assembly 36 also includes a second clamp 44 having a second pair of resilient arms 46 that mate with a pair of slots 48 (of which only one is illustrated in FIG. 2) of inlet end 32 of housing 30. The clamp assembly 36 is only an example, and other clamping arrangements been the housing 30 and the outline 25 are contemplated as are known in the art.

Outlet end 34 may be nozzle-shaped such that outlet end 34 may be inserted into an open end 35 (FIG. 1) of recirculation line 26 and oriented relative to housing 30 in any manner desired. In this regard, outlet end 34 can be oriented based on packaging considerations in the vehicle relative to other features of the vehicle, including relative to features of system 10. Recirculation check valve 12 also includes a valve member 50, a cylindrical insert or cage 52 for supporting valve member 50 when recirculation check valve 12 is in an open position, and a pair of annular seals 54 that are separated by an annular spacer 56.

Housing 30 may be formed of a rigid material such as a rigid polymeric material that is resistant to degradation when exposed to the fuel vapors or liquid fuel. Housing 30 includes an outer surface 58 that defines inlet end 32 and outlet end 34, and includes an interior surface 60. Interior surface 60 defines a first longitudinally extending bore or channel 62 that extends from inlet end 32 to a connection section 64 that connects inlet end 32 to outlet end 34. Interior surface 60 of outlet end 34 also defines a second longitudinally extending bore or channel 66 that extends along a length of outlet end 34 and is connected to first channel 62 at connection section 64 such that each channel 62, 66 are in fluid communication with each other based on a position of valve member 50.

As best shown in FIGS. 3 and 4, a diameter of first channel 32 changes as it extends from inlet end 32 in a direction toward connection section 64. In this regard, first channel 32 includes a first section 68 having a first diameter D1, a second section 70 having a second diameter D2 that is less than the first diameter D1, a third section 72 having a third diameter D3 that is less the second diameter D2, and a fourth section 74 having a diameter D4 that is less than the third diameter D3.

First section 68 is configured for receipt of annular seal members 54 and annular spacer 56 and terminates at a first radially inwardly extending shoulder 76. Second section 70 is configured for receipt of cylindrical insert 52 and terminates at a second radially inwardly extending shoulder 78 that, in the illustrated embodiment, may be angled (i.e., at 45 degrees) relative to the cylindrical surface defined by second section 70. It should be understood, however, that second radially inwardly extending shoulder 78 is not necessarily angled relative to second section 70. Third section 72 is configured for receipt of valve member 50 and terminates at a frustoconical-shaped valve seat 80 that, when engaged by valve member 50, closes recirculation check valve 12, as will be described in more detail later. Fourth section 74 extends from valve seat 80 to connection section 64. A diameter D5 of second channel 66 that is connected to first channel 62 may be constant along an entire length thereof, but it should be understood that the present disclosure contemplates a variable diameter if desired.

Again referring to FIG. 2 with continued reference to FIGS. 3 and 4, it can be seen that cylindrical insert 52 includes a first end 82 having a radially outwardly extending lip 84 that is configured to abut against first radially inwardly extending shoulder 76, and a second end 86 that is configured to abut against second radially inwardly extending shoulder 78. A cylindrical section 88 extends between first end 82 and second end 86 having an exterior surface 90 configured to abut with second section 70, and an interior surface 92 that defines a conduit 94 that permits fuel vapors and liquid fuel to flow through cylindrical insert 52.

A plurality of spaced-apart radially inwardly extending wedge-shaped protrusions 96 are located at second end 86 that radially narrow a diameter of conduit 94 such that valve member 50 may rest thereon when recirculation check valve 12 is in the open position. In this regard, because protrusions 96 are spaced apart from each other by gaps 97, fluid passageways are established in the gaps 97 that permit fuel vapors to flow therebetween and into second channel 66 of outlet end 34 of housing 30 and subsequently enter recirculation line 26. In the illustrated embodiment, there are four protrusions 96 are located about a circumference of the cylindrical conduit 94 at 0 degrees, 90 degrees, 180 degrees, and 270 degrees. It should be understood, however, that a greater or lesser number of protrusions 96 may be used without departing from the scope of the present disclosure. For example, there may be three protrusions 96 located at 9 degrees, 120 degrees, and 240 degrees, or there may be five or more protrusions 94 that equally spaced apart from each other. The important aspect to keep in mind is that valve member 50 may rest on the protrusions 96 while still permitting fuel vapors to pass through the gaps 97 and past valve member 50 when the recirculation check valve 12 is in the open position.

Valve member 50 may be a spherical member (i.e., ball valve) that has a diameter D6 that is less than the diameter D3 of third section 72 such that fluid may flow past valve member 50 when recirculation check valve 12 is in the open position. Valve member 50 may be hollow, or may be solid. In either case, valve member 50 should be formed of a material (e.g., a polymeric material) having a density that is less than that of the liquid fuel so that valve member 50 can, when exposed to liquid fuel as will be described in greater detail later, float and be moved from engagement with protrusions 96 through third section 72 until it engages valve seat 80 to close recirculation check valve 12.

Annular seal members 54 may be O-rings, or some other type of annular seal that is configured to sealingly engage with an exterior surface of outlet line 25 when outlet line 25 is inserted into housing 30 and secured using clamp assembly 36. Annular spacer 56 may be provided between annular seal members 54, or may be omitted. Regardless, annular spacer 56 may be formed of a polymeric material and is designed to maintain a spacing between annular seal members 54. Lastly, while not illustrated in FIG. 2, it should be understood that recirculation check valve 12 may include a retainer insert 98 (see, e.g. FIGS. 3 and 4) at inlet end 32 that can be inserted into housing 30 after valve 50, cylindrical insert 52, annular seal members 54 and annular spacer 56 have been inserted into and seated in first channel 62. Retainer insert 98 may include a radially outwardly extending protrusion 100 that extends about a circumference of insert 98 that is designed to mate with a radially inwardly extending recess 102 formed in channel 62. Once insert 98 is mated with recess 102, a position of each of the above-noted components of recirculation check valve 12 can be reliably maintained.

Now operation of recirculation check valve 12 will be described. When a vehicle including system 10 is not being refueled, vapors from fuel tank 16 may travel up filler tube 14 towards inlet 18, and also from recirculation line 25 to filler tube 14. Inasmuch as no nozzle 20 will be present during a non-fueling situation, the vapors will be prevented from exiting inlet 18 of filler tube 14 and entering the atmosphere due to the presence of flapper valves 22, which will be closed to seal inlet 18. It should be understood, however, that recirculation check valve 12 is usually in a "normally open" position that permits fuel vapors to flow past valve member 50 from inlet end 32 to outlet end 34, and from outlet end 34 to inlet end 32. The fuel vapors will be permitted to flow past valve member 50 in either direction because valve member 50 will be seated against protrusions 96 that are separated by gaps 97 that permit the fuel vapors to flow between the protrusions 96 and past valve member 50. The recirculation check valve 12 permitting two-way flow is illustrated in FIG. 3.

It is not desirable, however, for liquid fuel to pass through recirculation check valve 12 and enter recirculation line 26 because if liquid fuel enters recirculation line 26, the liquid fuel could potentially enter a vapor canister (not shown) that is attached to fuel line 28 that provides fuel to an engine (not shown) of the vehicle. Thus, in a fueling situation where nozzle 12 has been inserted into filler tube 14 and liquid fuel is flowing from nozzle 12 to tank 16, recirculation check valve 12 can prevent liquid fuel from entering recirculation line 26. In this regard, once tank 16 has been fully filled with liquid fuel, there will be a tendency for the fuel still being provided by nozzle 20 to begin to fill filler tube 14. As the liquid fuel moves up filler tube 14 it will reach and enter outlet 24 before entering check valve 12. As the liquid fuel passes through first channel 62 it will reach valve member 50, which as noted above has a density less than that of the liquid fuel. Accordingly, when exposed to liquid fuel the valve member 50 will disengage from being seated against protrusions 94 and begin to float upward through first channel 62 before reaching and seating against valve seat 80 to close recirculation check valve 12 and prevent the liquid fuel from entering second channel 66 and recirculation line 26. The recirculation check valve 12 in the closed position is shown in FIG. 4.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A fuel system for a vehicle, comprising:
- a fuel tank configured to carry a liquid fuel;
- a filler tube in communication with the fuel tank, the filler tube having an inlet configured for receipt of a fuel nozzle and an outlet downstream from the inlet and upstream from the fuel tank;
- a recirculation check valve attached to the outlet; and
- a recirculation line that is connected to the recirculation check valve;

wherein the recirculation check valve includes:
- a housing having an inlet end attached to the outlet and an outlet end attached to the recirculation line, and a channel extending between the inlet end and the outlet end that fluidly connects the outlet of the filler tube to the recirculation line, the channel including a first section having a first diameter, a second section having a second diameter that is less than the first diameter, a third section having a third diameter that is less than the second diameter, and a fourth section having a fourth diameter that is less than the third diameter;
- a hollow cylindrical insert provided in the channel between the inlet end and the outlet end, the hollow cylindrical insert having a plurality of radially inwardly extending projections provided around an inner circumference of the hollow cylindrical insert that are separated by a plurality of gaps therebetween;
- at least one annular seal provided in the first section between the inlet end and the hollow cylindrical insert; and
- a valve member provided in the channel between the hollow cylindrical insert and the outlet end of the housing, and configured to move between an open position where the valve member is seated against the plurality of radially inwardly extending projections and a closed position where the valve member is seated against a valve seat formed in the channel;

wherein in the open position, fumes of the liquid fuel are permitted to travel from the fuel tank through the filler tube and the channel of the recirculation check valve by passing through the plurality of gaps past the valve member to the recirculation line, and fumes of the liquid fuel in the recirculation line are permitted to enter the outlet end of the housing and flow through the channel of the recirculation check valve by passing past the valve member and through plurality of gaps to the filler tube; and wherein when liquid fuel enters the inlet end of the recirculation check valve and reaches the valve member, the valve member is configured to move away from being seated against the plurality of protrusions in a direction toward the valve seat to close the recirculation check valve and prevent the liquid fuel from exiting the outlet end of the housing and entering the recirculation line.

2. The fuel system according to claim 1, wherein the valve member is a ball valve formed of a material having a density less than that of the liquid fuel.

3. The fuel system according to claim 1, wherein the first section is separated from the second section by a radially inwardly extending shoulder.

4. The fuel system according to claim 3, wherein the hollow cylindrical insert includes first end that includes a radially outwardly extending lip, a second end that includes the plurality of radially inward extending projections, and a cylindrical section that extends between the first end and the second end, and wherein the radially outwardly extending lip being configured to abut against the radially inwardly extending shoulder, and the radially inwardly extending projections and cylindrical section being provided in the second section of the channel.

5. The fuel system according to claim 1, wherein the third section is separated from the fourth section by the valve seat.

6. The fuel system according to claim 5, wherein the valve member has a diameter that is less than a diameter of the third section.

7. The fuel assembly according to claim 1, wherein a pair of the annular seals are provided in the first section that are separated by an annular spacer.

8. The fuel assembly according to claim 7, further comprising a retainer insert between the inlet end of the housing and the pair of annular seals that are separated by the annular spacer.

9. A recirculation check valve configured for use in a fuel system for a vehicle that includes a fuel tank configured to carry a liquid fuel; a filler tube in communication with the fuel tank and having an inlet configured for receipt of a fuel nozzle and an outlet downstream from the inlet and upstream from the fuel tank;

and a recirculation line that is connected to the recirculation check valve, the recirculation check valve comprising:

a housing having an inlet end configured to be attached to the outlet and an outlet end configured to be attached to the recirculation line, and a channel extending between the inlet end and the outlet end that is configured to fluidly connect the outlet of the filler tube to the recirculation line, the channel including a first section having a first diameter, a second section having a second diameter that is less than the first diameter, a third section having a third diameter that is less than the second diameter, and a fourth section having a fourth diameter that is less than the third diameter;

a hollow cylindrical insert provided in the channel between the inlet end and the outlet end, the hollow cylindrical insert having a plurality of radially inwardly extending projections provided around an inner circumference of the hollow cylindrical insert that are separated by a plurality of gaps therebetween;

at least one annular seal provided in the first section between the inlet end and the hollow cylindrical insert; and a valve member provided in the channel between the hollow cylindrical insert and the outlet end of the housing, and configured to move between an open position where the valve member is seated against the plurality of radially inwardly extending projections and a closed position where the valve member is seated against a valve seat formed in the channel;

wherein in the open position, the recirculation check valve is configured such that fumes of the liquid fuel are permitted to travel from the fuel tank through the filler tube and the channel of the recirculation check valve by passing through the plurality of gaps past the valve member to the recirculation line, and fumes of the liquid fuel in the recirculation line are permitted to enter the outlet end of the housing and flow through the channel of the recirculation check valve by passing past the valve member and through plurality of gaps to the filler tube; and wherein the recirculation check valve is configured such that when liquid fuel enters the inlet end of the recirculation check valve and reaches the valve member, the valve member is configured to move away from being seated against the plurality of protrusions in a direction toward the valve seat to close the recirculation check valve and prevent the liquid fuel from exiting the outlet end of the housing and entering the recirculation line.

10. The check valve according to claim 9, wherein the valve member is a ball valve formed of a material having a density less than that of the liquid fuel.

11. The check valve according to claim 9, wherein the first section is separated from the second section by a radially inwardly extending shoulder.

12. The check valve according to claim 11, wherein the hollow cylindrical insert includes first end that includes a radially outwardly extending lip, a second end that includes the plurality of radially inward extending projections, and a cylindrical section that extends between the first end and the second end, and wherein the radially outwardly extending lip being configured to abut against the radially inwardly extending shoulder, and the radially inwardly extending projections and cylindrical section being provided in the second section of the channel.

13. The check valve according to claim 9, wherein the third section is separated from the fourth section by the valve seat.

14. The check valve according to claim 13, wherein the valve member has a diameter that is less than a diameter of the third section.

15. The check valve according to claim 9, wherein a pair of the annular seals are provided in the first section that are separated by an annular spacer.

16. The check valve according to claim 15, further comprising a retainer insert between the inlet end of the housing and the pair of annular seals that are separated by the annular spacer.

* * * * *